United States Patent [19]

Simone

[11] Patent Number: 4,632,632
[45] Date of Patent: Dec. 30, 1986

[54] PROGRAMMABLE INDUSTRIAL ROBOT HAVING SIMPLIFIED CONSTRUCTION

[75] Inventor: Raymond J. Simone, St. Louis, Mo.

[73] Assignee: Automation Equipment Company, St. Louis, Mo.

[21] Appl. No.: 527,839

[22] Filed: Aug. 30, 1983

[51] Int. Cl.⁴ .............................................. B25J 9/00
[52] U.S. Cl. ................................ 414/744 A; 901/17; 901/22; 901/37; 901/50
[58] Field of Search ...................... 901/17, 22, 37, 50, 901/43; 414/744 A, 783

[56] References Cited

U.S. PATENT DOCUMENTS

| | | | |
|---|---|---|---|
| 2,998,887 | 9/1961 | Sommer | 901/17 X |
| 3,935,950 | 2/1976 | Burch | 901/17 X |
| 3,986,007 | 10/1976 | Ruoff, Jr. | 901/17 X |
| 4,015,721 | 4/1977 | Scheler | 901/17 X |
| 4,042,122 | 8/1977 | Espy et al. | 414/783 X |
| 4,378,959 | 4/1983 | Susnjara | 901/43 X |

*Primary Examiner*—Terrance L. Siemens
*Attorney, Agent, or Firm*—Polster, Polster and Lucchesi

[57] ABSTRACT

A low cost, programmable industrial robot is provided which incorporates a simplified construction with relatively sophisticated movement capability. Preferably, the robot is pneumatically operated. The robot construction includes a series of simplified structures for both calibrating ease and providing relatively versatile movement in view of the overall product cost. The device provides four adjustable axes of movement and multiple axes mounting for an end effector. In the preferred embodiment, a rotary actuator provides rotational movement for the robot. Rotary movement is adjustable and a simplified structure is included for providing repeatable intermediate stop positions for the work arm of the device. An improved rotary manifold for a rotary actuator provides a conduit for pneumatically powering the remaining robot movement functions. Those functions include vertical reciprocal movement, horizontal reciprocal movement and rotary movement of a gripper device or some other end effector. Each of the movement axes may be adjusted and the mounting of the gripper device is arranged to provide quick, easy adjustment of the gripper. Other end effector devices can be mounted to the horizontal arm in a plurality of positions.

10 Claims, 27 Drawing Figures

PROGRAMMABLE INDUSTRIAL ROBOT HAVING SIMPLIFIED CONSTRUCTION

BACKGROUND OF THE INVENTION

This invention relates to industrial robots of simplified form. While the invention is described with particular reference to such robot applications, those skilled in the art will recognize the wider applicability of the inventive principals discussed hereinafter.

Recently, the robotic segment of automated technology has attracted widespread attention. The technology spans a range from sophisticated computer controlled robotic devices to less complex pick-and-place units often driven under microprocessor controls. While prior art robots work well for their intended purposes, in general the market for these robots has been limited because of the inherent high manufacturing and selling costs of the robot construction. Industrial robots are generally equipped with a single "arm". They are used to perform assembly line operations and other repetitive tasks. A device known as the "unimate" robot has been known in the art and used commercially for a long time. This robot has five movements, extension or retraction of the arm, up or down movement of the arm, rotation of the arm from side to side about a vertical axis, rotation of the hand about the wrist axis, and pivoting of the hand at right angles to the wrist axis. The hand is fitted with a pair of gripping fingers which are operated pneumatically and whose length depend upon the task to be performed. The gripping pressure applied between the fingers varies with the pressure of the air supply. The various movements of the arm are actuated hydraulically and the sequence of operation is stored on a suitable device.

My invention provides similar movements of the unimate robot at a substantially lower cost. While the control functions are programmable, the program is substantially simplified because various movements of the robot are controlled mechanically with simplified physical structure. The device is specifically intended to be relatively portable for easy set up and low cost. It incorporates at least one accurate intermediate stop position which enhances the versatility of the device without increasing overall cost. Because of its lower cost, the market potential of the robot is increased substantially, as a great many more businesses can cost justify their entrance into automated production techniques.

One of the objects of this invention is to provide a reliable industrial robot.

Another object of this invention is to provide a robot capable of relatively sophisticated movements at a low cost.

Another object of this invention is to provide an industrial robot that utilizes simplified programming instructions because at least one of the robot movements are programmed mechanically.

Yet another object of this invention is to provide a robot having wrist movement in which the gripper element may be changed simply and programmed mechanically.

Other objects of this invention will be apparent to those skilled in the art in light of the following description and accompanying drawings.

SUMMARY OF THE INVENTION

In accordance with this invention, generally stated, an industrial robot is provided which accommodates four degrees of movement with simplified construction and program control. In the preferred embodiment, both wrist position and wrist rotational movement are programmable mechanically. Rotational movement of the robot about a vertical axis also is mechanically programmable and is arranged so that intermediate stop positions are available. The intermediate stop position can be reached accurately and repeatedly. Wrist rotation actuators are replaceable and multipositional to provide a plurality of grip positions and movements. The device is compact and relatively light weight for portability and ease of set-up.

BRIEF DESCRIPTION OF THE DRAWINGS

In the drawings,

FIG. 7I is an exploded view of the rotary air manifold assembly;

DESCRIPTION OF THE PREFERRED EMBODIMENT

Figure 1:
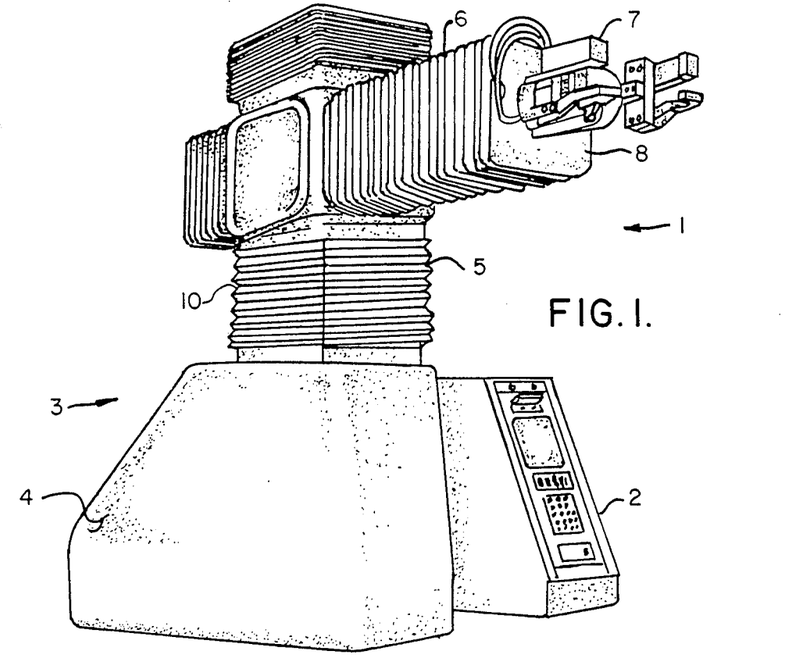
FIG. 1 is a view in perspective of one illustrative embodiment of robot of this invention.

Referring now to FIG. 1, reference numeral 1 indicates one illustrative embodiment of industrial robot of this invention which operates under program control provided by a microprocessor or similar control device 2.

The microprocessor 2 is conventional and may comprise any of a variety of commercially available devices. The microprocessor 2 forms no part of this invention, and consequently is not described in detail. However, as later described, the microprocessor 2 controls actuation of certain pneumatic devices which in turn supply fluid pressure to other operable mechanisms to control operation of the robot 1. The microprocessor 2 can be programmed either initially at the factory or in the field, and its common availability means that generally it is lower in cost than special purpose or specially designed devices.

The robot 1 includes a base assembly 3, including an enclosure 4, from which a vertical slide assembly 5 extends. A horizontal side assembly 6 extends from the vertical side assembly 5. The horizontal side assembly 6 has a suitable end effector or gripping means 7 extending from an end 8 of the horizontal slide assembly 6. The gripping means 7 performs the final part manipulative work. The horizontal and vertical slide assemblies 5 and 6, respectively, may be enclosed in a suitable protective or esthetic cover. A bellows 10 works well, for example.

Figures 2, 3:
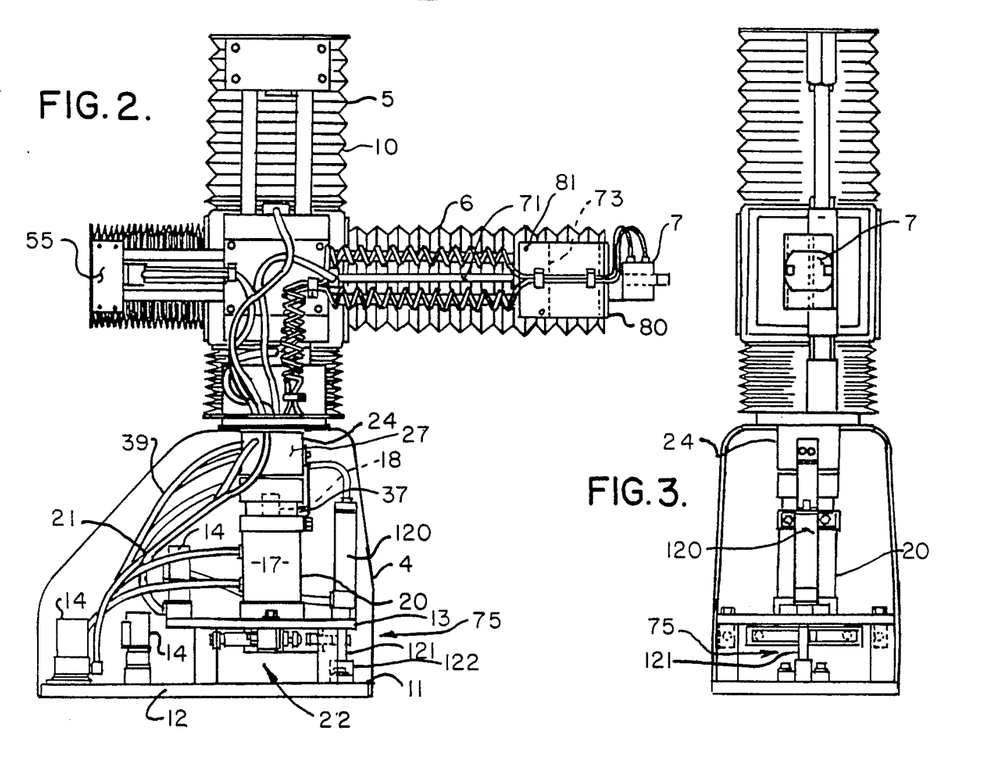
FIG. 2 is a view in side elevation, partly broken away, of the robot shown in FIG. 1.
FIG. 3 is a front elevational view, partly broken away, of the robot shown in FIG. 2.

The detail construction features of the robot 1 are best observed with respect to FIGS. 2–13. As is best shown in FIG. 2, for example, and FIGS. 5A through 5C, a base plate 11 includes a flat surface 12 and a raised platform 13. The surface 12 is used to mount a plurality of fluid control solenoids 14. The number of solenoids 14 employed with a particular robot 1 varies in different embodiments of this invention, and depends upon the programming employed in the microprocessor 2. For purposes of this specification, however, it is important to note that there is a relatively large mounting area available for positioning a sufficient number of the solenoids 14 in the robot 1 so that full utilization of the device can be achieved. The respective lengths and widths of the platform 13 with respect to the surface 12 may vary in other embodiments of this invention, and one such variation is illustratively shown in the drawing of the base plate 11 disclosed in FIGS. 2 and 5A. In FIG. 2, the platform 13 is extended to enable the platform 13 to receive at least one additional solenoid. The extension is shown in phantom lines in FIG. 5A, and indicated by the reference numeral 13'.

The platform 13 is mounted to the surface 12 in any convenient way. Conventional threaded fasteners and leg/spacers work well, for example. The platform 13 has a central opening 15 formed in it, and has a concentric pattern of openings 16, positioned about the opening 15. Although a concentric pattern has been employed with respect to the openings 16, again, the opening pattern is a matter of design choice, and may vary in other embodiments of this invention. Various mounting openings 9 also are formed in the platform 13. The openings 9 are intended to receive and permit attachment of a rotary actuator 20.

The rotary actuator 20 is operatively connected to predetermined ones of the solenoids 14 by suitable fluid lines 21. As indicated above, the actuator 20 is operated by energization of the solenoids 14. The actuator 20 has a shaft 18, partially shown in phantom lines in FIG. 2, extending vertically outwardly from each end of it, in the operatively mounted position of the actuator 20. The shaft 18 of the actuator 20 is rotatably mounted with respect to a shell 17 of the actuator 20. Actuator 20 is conventional in operation, and a variety of commercially available devices are compatible with the application described here provided the actuator 20 construction is modified to comply with this specification. A lower end of the shaft 18 of the rotary actuator 20, lower being referenced to FIG. 2, is used to attach a stop means 22 of a stop system 47 to the shaft. Stop system 47 is described in greater detail hereinafter. For present purposes, it is sufficient to note that the stop system 47 can be selectively set to vary or adjust the degree of rotation permitted the shaft of the rotary actuator 20 between a variety of preset limits and that an intermediate stop position can be reached accurately and repeatedly, regardless of the direction of approach. In addition, the rotary motion of the shaft 18 for the rotary actuator 20 can be stopped intermediately of the end swing positions of the shaft 18, as later described in conjunction with stop system 47 and stop means 22 operation.

The rotary actuator 20 has a second shaft end which is adapted to drive a slide connector plate 23 through an air manifold assembly 24. The air manifold assembly 24 is best seen in FIG. 7I. As there observed, a split lock collar 25 (shown in detail in FIG. 7E) is utilized to attached the manifold assembly 24 to the second end of shaft 18 of rotary actuator 20. The collar 25 construction is such as to provide a simple adjustment technique. That is to say, the segment of angular motion permitted robot 1 can be located anywhere in a full circle around the vertical axis of the robot 1 by adjustment of the collar 25. A bearing 26 is positioned between the collar 25 and an air manifold sleeve 27. The air manifold sleeve 27 is a cylindrical device sized to receive an air manifold core 28. The manifold assembly 24 is mounted to the slide connector plate 23 by conventional threaded fasteners 19. Other connecting devices or methods may be employed, if desired.

Figure 6A:
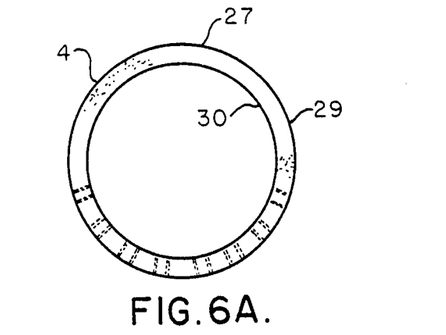
FIGS. 6A, 6B, and 6C are respectively top, side, and end views of the outer shell of a rotary air manifold employed in conjunction with the robot of FIG. 1.
Figure 6B:
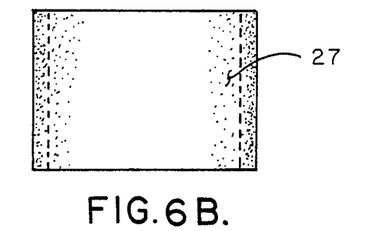
Figure 6C:
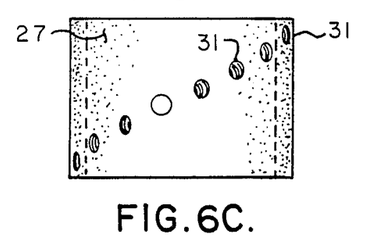

Referring now to FIGS. 6A–C, it is seen that the sleeve 27 is a cylindrical device having a first side wall 29 and a second side wall 30 separated by a material thickness. A plurality of openings 31 extend between the walls 29 and 30. In the embodiment illustrated, the openings 31 are positioned successively diagonally across the axial dimension of the sleeve 27. Those skilled in the art will recognize that other physical arrangements for the openings 31 can be used, so long as those arrangements enable the air manifold assembly 24 to function in the manner described. As indicated, the sleeve 27 has an internal diameter sized to receive the air manifold core 28.

Air manifold core 28 is a generally solid cylindrical section, best observed in FIGS. 7A–D. Air manifold core 28 has an outer wall 38 having a plurality of lands 32 and grooves 33 formed in it. Alternate ones of the grooves 33 are sized to receive O-rings, not shown, which, together with the lands 32 provide a plurality of spaced, segregated passages about the circumference of the air manifold core 28. The air manifold core 28 has a plurality of radially extending passages 34 formed in it, best seen in FIG. 7D, which mate with a predetermined one of the grooves 33 on one end of the passage 34, and communicate at a second end of the passages 34 with a preselected one of a plurality of axial openings 35. Of course, if the opening pattern 31 in the sleeve 27 is varied, the position of the opening 35 and passages 34 also may vary. The opening 31, groove 33, passage 34, opening 35 arrangement provides a communicative path from preselected ones of the solenoids 14 for fluid pressure, supplied along fluid lines 39 to other operative elements of the robot 1.

Figure 7A:
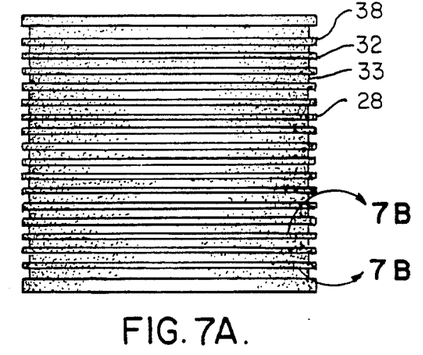
FIG. 7A is a view in side elevation of a core of the rotary air manifold employed in the robot of FIG. 2.
Figure 7B:
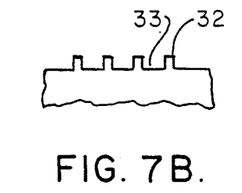
FIG. 7B is an exploded view of the land and groove arrangement taken about the area B—B of FIG. 7A.
Figure 7C:
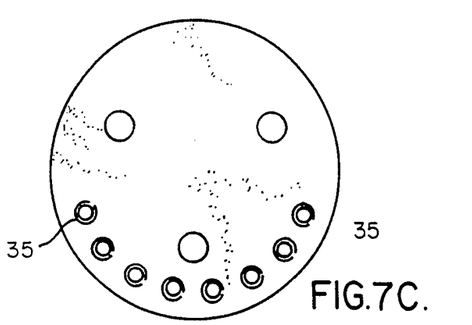
FIGS. 7C and 7D are respective top plan and side elevation views of the interior core element shown in FIG. 7A.
Figure 7D:
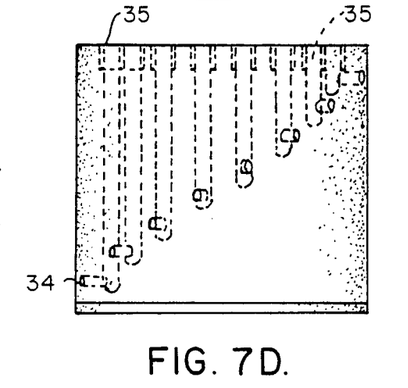
Figure 7E:
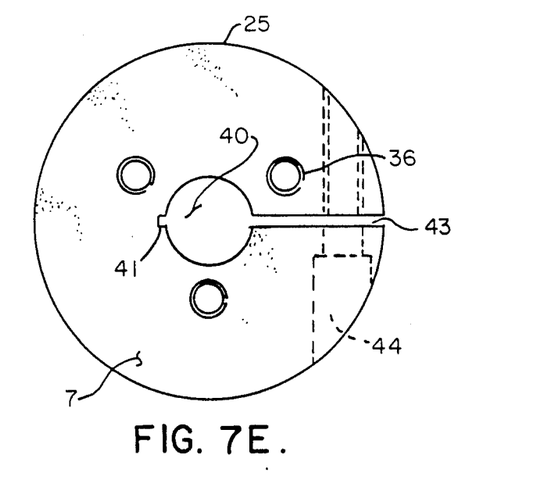
FIGS. 7E and 7F are respective plan and end elevational views of a split collar lock mechanism employed with a rotary air manifold assembly used in conjunction with the robot of FIG. 1.
Figure 7F:
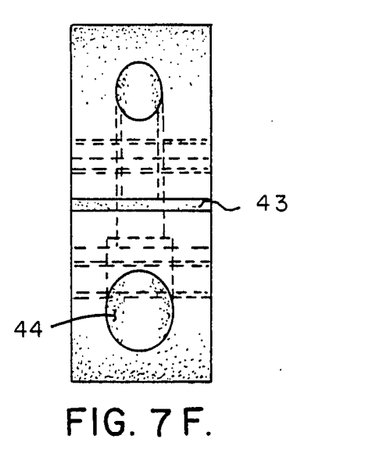
Figure 7G:
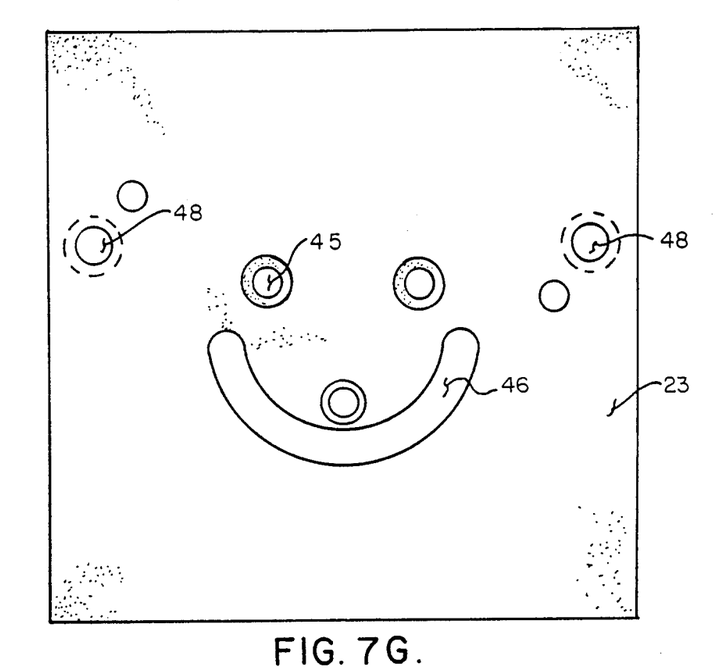
FIGS. 7G and 7H are respective top plan and end elevational views of a connector plate employed with the rotary air manifold assembly.
Figure 7H:
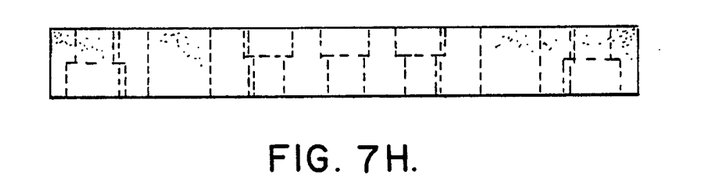

As shown in FIG. 7E, the split collar or ring 25 has an axial opening 40 formed in it. The opening 40 is sized to receive the shaft 18 of the rotary actuator 20. The opening 40 may be provided with a keyway 41, to ensure positive drive engagement between a key attached to the shaft 18 of the rotary actuator 20 and the rotating parts of manifold assembly 24. A plurality of mounting openings 36 are provided outboard of the opening 40. The openings 36 are sized to receive the fasteners 19 used to hold the manifold assembly 24 as an integral unit. The material thickness of the collar 25 is split along a radially extending groove 43. The collar 25 has an internally threaded, chordal passage 44 formed in it, which is sized to receive a correspondingly threaded fastener, not shown. Tightening the fastener closes the gap or groove 43 of the split collar, thereby attaching the collar 25 to the shaft of the rotary actuator 20. A thrust bearing 37 preferably is positioned between the actuator 20 and the air manifold assembly 24. Thrust bearing 37 is conventional and is not described in detail.

The slide connector plate 23 is, in the embodiment illustrated, a rectangular plate having a plurality of mounting openings 45 formed in it. The openings 45 are sized to receive the fasteners 19, as previously described. The plate 23 also has an arcuate opening 46 formed in it, which is positioned so as to permit communication through the plate 23 for the openings 35 of the air manifold core 28. Thus, a fluid path extends from the solenoids 14, through the air manifold assembly 24 to the vertical slide assemblies 5 and 6. The sleeve 27 is stationary during operation of the robot 1. That means that the fluid lines connected to the fluid path do not interfere with the rotation of the robot 1. As observed in FIG. 7G, the plate 23 also has a series of openings 48 which are utilized to mount the vertical slide assembly 5 to the slide connector plate 23.

Figure 4:
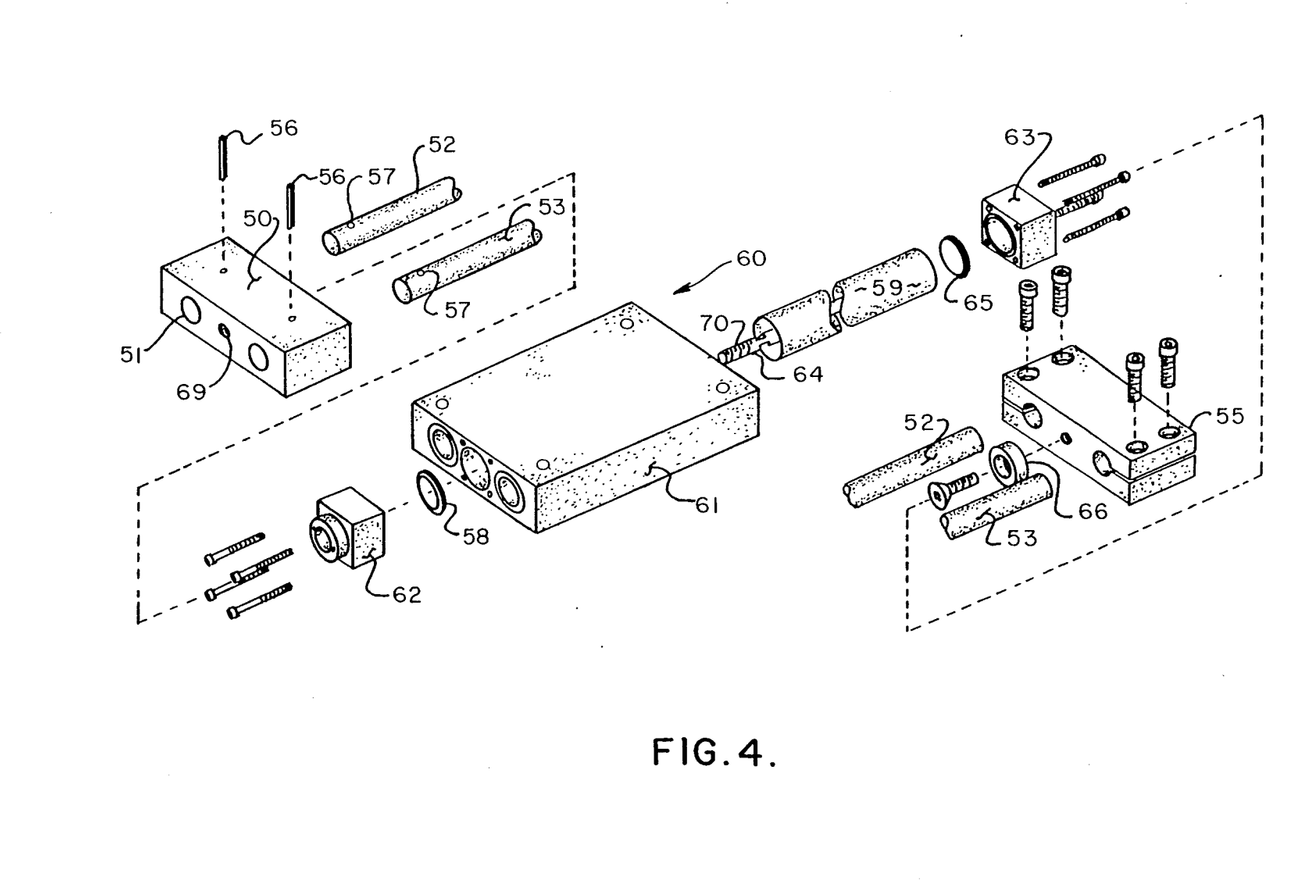
FIG. 4 is an exploded view of one illustrative embodiment of slide actuator employed with the robot of FIG. 1.
Figures 5A, 5B:
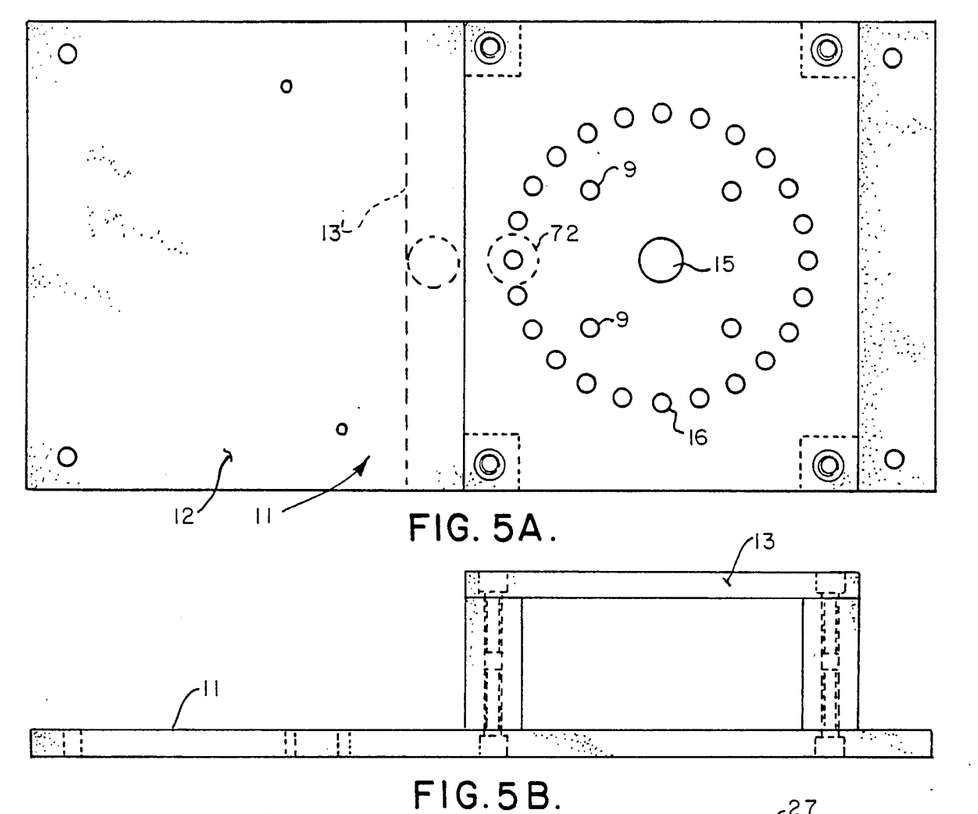
FIG. 5A is a top plan view of one illustrative embodiment for support structure utilized in conjunction with the robot of FIG. 1.
FIG. 5B is a view in side elevation of the support shown in FIG. 5A.
Figure 5C:
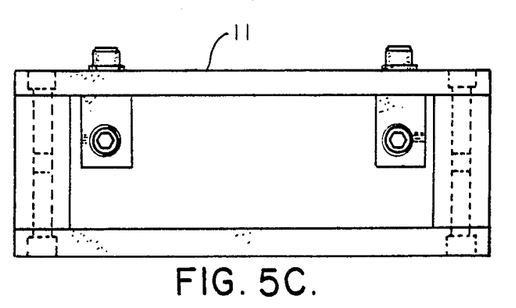
FIG. 5C is a end elevational view of the support shown in FIG. 5A.

The vertical and horizontal slide assemblies 5 and 6, may, if desired, be identical, and only the slide assembly 5, shown particularly in FIG. 4, is described in detail, for simplicity of this specification. Depending upon operations performed with the robot 1, one or both of the assemblies 5 and 6 may be altered to permit the robot 1 to handle heavier loads or to provide differences in distances of travel, for example. In the embodiment illustrated, the assemblies 5 and 6 are mounted perpendicularly to one another, as best seen in FIGS. 2 and 3. Those skilled in the art will recognize that other mounting arrangements can be used.

Referring now to FIG. 4, a stationary tooling block 50 has a pair of openings 51 formed in it, which are sized to receive a pair of guide rods 52 and 53, respectively. The rods 52 and 53 extend from the tooling block 50 to an adjustable tooling block 55 spaced a predetermined distance from the tooling block 50 along the rods 52 and 53. The rods 52 and 53 are captured in the block 50 by spring pins 56 which mount in corresponding openings 57 in the rods 52 and 53, respectively. A pneumatically operated cylinder 60 includes a piston 59 operatively associated with a main body assembly 61. The main body assembly 61 has an end block 62 mounted to it. An O-ring 58 is interposed between the block 62 and a cylinder sleeve of the cylinder 60. A second end block 63 is mounted to the main body assembly 61 on an end opposite to the end block 62. End block 63 too has an O-ring 65 interposed between it and the cylinder sleeve of the cylinder 60. A rod 64 has a thread end 70 inserted in an opening 69 in the tooling block 50.

A stop 66 is attached to the adjustable tooling block 55 by any suitable means. Stop 66 can be a resilient material, so that it provides some cushion during its operation as a limit for main body assembly 61 movement. Stop 66 can be replaced with an adjustable energy absorbing device such as a shock absorber, if desired.

The adjustable block 55 employs a split bore construction, so that it may be adjusted on the guide rods 52 and 53 to define and limit the upper vertical distance of travel for the robot 1. That movement is accomplished by directing fluid pressure to one of the opposed sides of the piston 59 through one of the end blocks 62 and 63. Since rod 64 is fixed to the tooling block 50, pressure on the end block 62 forces the slide assembly 61 downwardly, referenced to FIG. 2, on the guide rods 52 and 53, while pressure on the end block 62 forces the slide assembly 61 in the opposite direction, until it meets stop 66.

As indicated, the horizontal slide 6 is constructed similarly to the vertical slide assembly 5. Horizontal slide 6 is mounted to the main body assembly 61 so that it travels with the main body assembly 61 during assembly 61 movement. The construction of the horizontal slide 6 is similar the vertical slide assembly 5 in that a rod 71 is actuated by a fluid cylinder 68. The movable end of the rod 71 is directly attached to a movable tooling block 73, shown in phantom lines in FIG. 2. A mounting bracket 80, in turn, is attached to the movable tooling block 73. Mounting bracket 80 thus is movable under control of the cylinder 68.

Figure 8A:
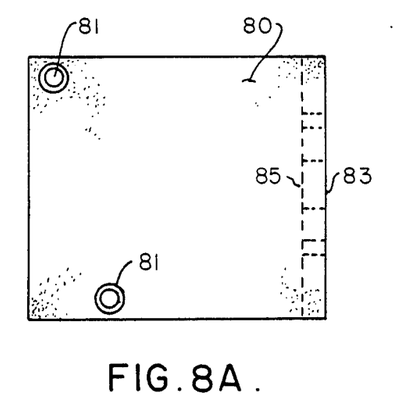
FIGS. 8A, 8B, and 8C are respective top, side and end views of one illustrative embodiment of mounting plate employed with the wrist actuator utilized in conjunction with the robot of FIG. 1.
Figure 8B:
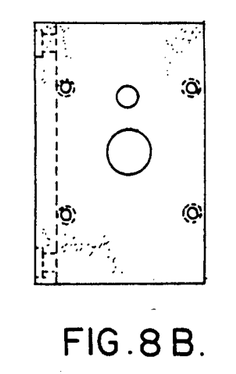
Figure 8C:
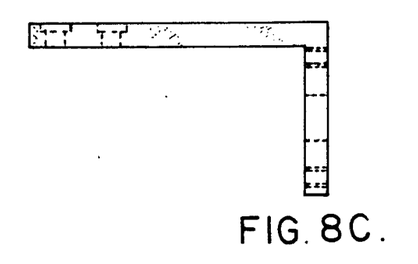
Figure 9:
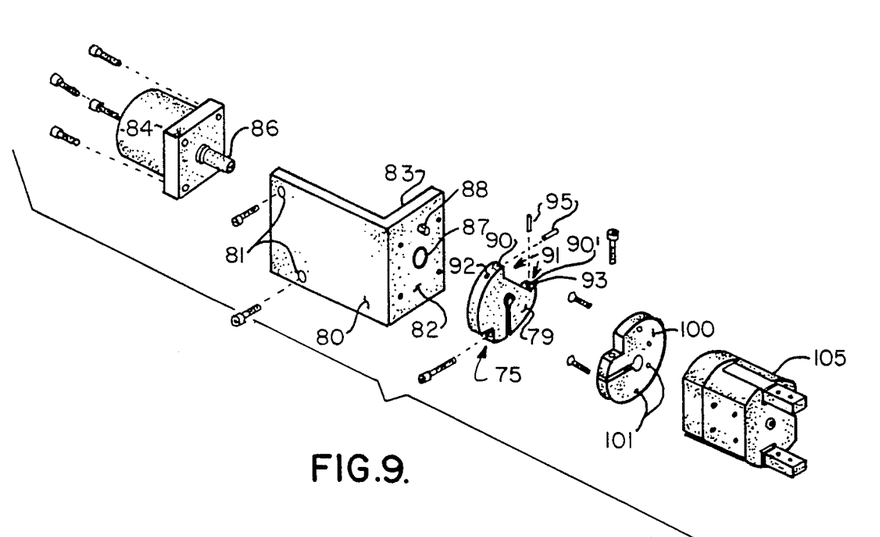
FIG. 9 is an exploded view of an illustrative embodiment of wrist actuator assembly employed in conjunction with the robot of FIG. 1.

The mounting bracket 80, shown in FIGS. 8A, B and C and FIG. 9 is attached to the movable tooling block 73 of the horizontal slide 6 along openings 81 in the mounting block 80. The mounting block 80 preferably is L-shaped in side elevation, as observable in FIG. 8C, and includes a mounting end 83 defined as the short leg of its L shape. A rotary actuator 84 is mounted to a face 85 of the end 83 by suitable threaded fasteners. The actuator 84 includes a shaft 86, which extends through an opening 87 in end 83 of the block 80. The block 80 also has a positioning stop pin 88 attached to it and extending outwardly of a face 82 of the end 83, for purposes later described in greater detail.

A split lock cam means 75 is mounted to the shaft 86 in split collar locking fashion. The lock cam 75 includes an arcuate cam area 91 which rotates about the stop pin 88. The cam area 91 has a pair of set point openings 92 and 93 formed in a pair of opposed stop walls 90 and 90', respectively. The openings 92 and 93 are sized to receive respective ones of a pair of set screws 95. The set screws 95 are adjustable to define positive stop points delimited when the screws 95 engage the stop pin 88. That engagement prevents further rotation by the rotary actuator 84 in a direction toward the stop 88.

Figure 10:
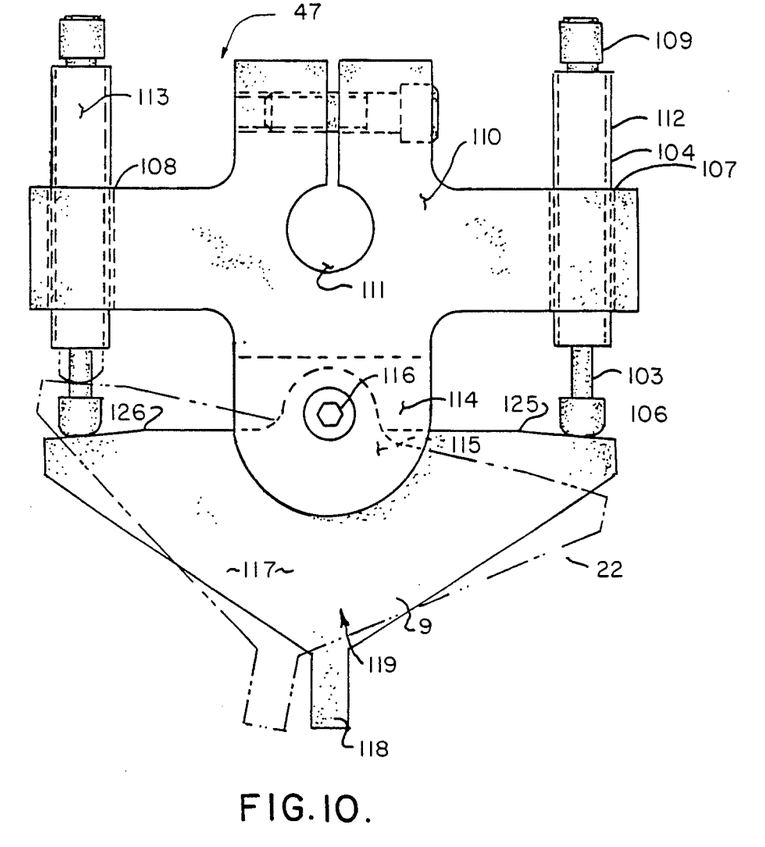
FIG. 10 is a top plan view of one illustrative embodiment of intermediate stop mechanism for the robot of FIG. 1.
Figure 11:
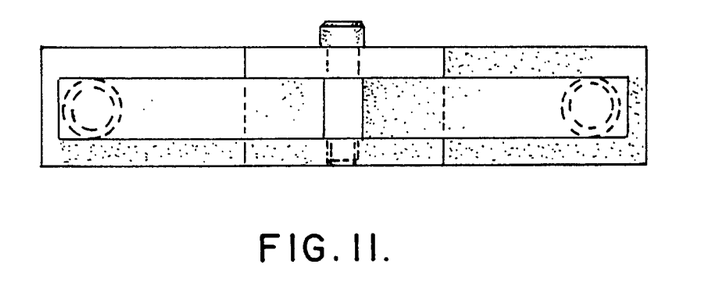
FIG. 11 is a view in end elevation of the intermediate stop shown in FIG. 10.

A mounting collar 100 also is attached to the shaft 86 of the rotary actuator 84. The collar 100 has a plurality of openings 101 formed in it, pairs of which are utilized to mount the collar to a body of a a wrist action end effector or gripper 105. The wrist action gripper 105 is conventional and a number of devices suitable for the purpose may be employed in conjunction with the rotary actuator 84. It is important to here note, however, that the gripper 105 may be selectively rotated by attaching the arm to various pairs of the opening 101 plurality. This mounting flexibility defines a first adjustment for the gripper 105. The collar 100 is mounted to the body 105 by conventional threaded fasteners. The collar 100 thereafter in turn is attached to the shaft 86 of the actuator 84 by tightening the fastening screw in the split collar. It is thus apparent that in addition to the selected rotation permitted by the attachment of the gripper 105 in the openings 101, a further second adjustment can be accomplished merely by rotating the collar 100 on the shaft 86. The wrist motion of the gripper 105 also can be adjusted by the set screw 95/stop 88 relationship which defines a third adjustment for the gripper 105. Of course, the gripper 105 moves reciprocally with the horizontal slide 6. Movement of the slide can be varied by adjusting the position of tooling block 55. This is an important feature of my invention in that very precise locating movements can be programmed mechanically by proper adjustment of the four adjustments just described FIG. 10 illustrates the preferred construction of the rotational stop mechanism 22 of the stop system 47 employed in the preferred embodiment of my invention. The stop mechanism 22 includes a stop mounting block 110 having a central opening 111 formed in it. Again, a split collar design is utilized to attach the stop block 110 to the shaft of the rotary actuator 20, as previously indicated. The mounting block 110 has a pair of shock absorber stop devices 112 and 113, respectively, threadly mounting in an opening 107 and an opening 108, respectively, formed in the mounting block 110. Because of their threaded mounting, the stop devices 112 and 113 are adjustable along their longitudinal axis. Each of the devices 112 and 113 includes an adjustment knob 109 for varying the rate of deceleration provided by the stop mechanism 22. A bumper 106 is attached to a shaft 103. The shaft 103 is resiliently mounted within a body 104 of the stop devices 112, so that the bumper 106 cushions and selectively slowly stops anything coming into contact with it. Adjustment knob 109 adjusts the selective cushioning of the shaft 103/bumper 106 operation.

The block 110 also has a clevice 114 formed in it, which receives a yoke 115 of a stop member 117. The stop member 117 has a stop projection 118 extending outwardly from it. The yoke 115 has an opening in it sized to receive a threaded fastener 116. The fastener 116 attaches the stop member 117 to the block 110 in a conventional manner and permits rotational movement of the stop member 117 until a side 125 or a side 126 of stop member 117 contacts the bumper 106 of stop devices 112 and 113, respectively. The stop member 110 rotates with the shaft of the rotary actuator 20 until the stop 117 meets a positionable stop, at which time the rotary actuator will work against the prepositioned stop and one of the stop devices 112 and 113, depending upon direction of rotation, will compress until further travel is not possible. This permits a very smooth transition from the rotation of the rotary actuator 20 to permit the robot to come into an exact, desired position. The openings 16 in the platform 13 are used to attach any of a variety of positionable stops to the robot 1. The positionable stop may be similar to a stop member 130 and 132, shown in FIG. 12. The stop members 130 and 132 may be made adjustable, if desired. The openings 16 preferably are located but not limited to fifteen degree increments about a center corresponding to the center of opening 15. As will be appreciated by those skilled in the art, the positionable stops in turn preferably also may incorporate additional separate adjustments to permit very precise movement control of the robot 1.

A principal feature of my invention is that the stop system 47 just described is very easily and simply compatible with the provision of intermediate stop operation during rotation of the rotary actuator 20. For example, a pneumatic actuator 120, shown in FIG. 2, may be mounted on the platform 13 of the plate 11. The pneumatic actuator 120 includes a rod 121 having a diameter sized for reception in a support block 122. The rod 121 also is sized so as to permit it to drop through one of the openings 16 in the platform 13. In operation, the actuator 120 either raises or lowers the rod 121 so as to clear or obstruct the motion of the stop projection 118.

As indicated, the rotary actuator 20 is caused to rotate in either a clockwise or counter clockwise position until one of the stop devices 112 or 113 bottom out, caused by the engagement of the stop projection 118 with a positionable stop. The interaction of the stop projection 118 and the positionable stops thus define the full scope of travel for the actuator 20. When an intermediate stop position is desired, the solenoid 120 is operated so that the rod 121 extends into the path of the stop projection 118. As the stop projection 118 engages the rod 121 of the actuator 120, one of the a stop devices 112 or 113 will again operate to cause the robot 1 to approach this intermediate position in a slow, even fashion. Thereafter, the pin can be retracted and the rotary actuator 20 will proceed in its original direction or in a reverse direction, depending upon program control. In each instance, the use of the stop devices 112 and 13 permit the robot to approach the intermediate stop position in a controlled, even way.

Figures 12, 13:
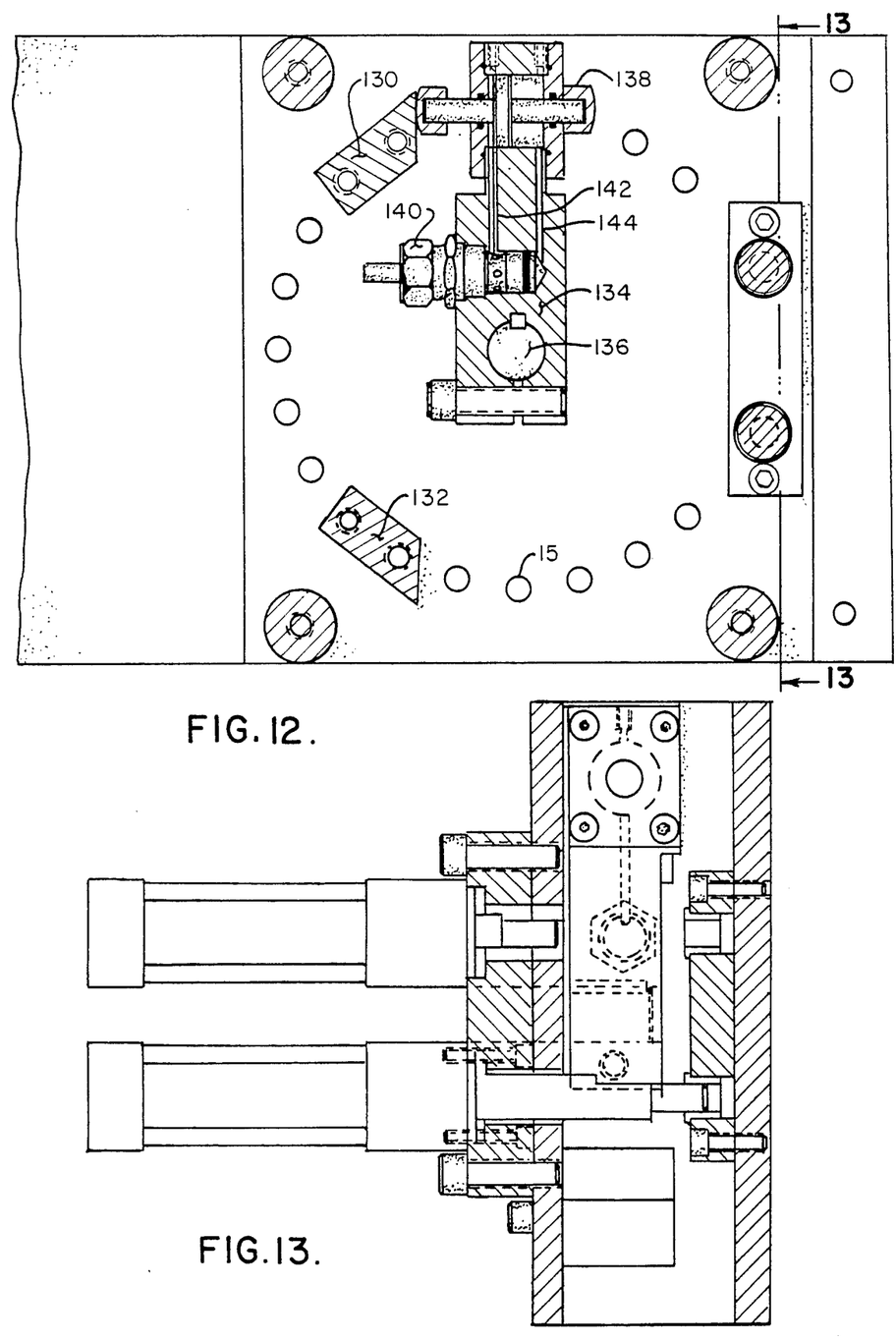
FIG. 12 is a top plan view of a second illustrative embodiment of intermediate stop mechanism for the robot of FIG. 1.
FIG. 13 is a sectional view taken along the line 13—13 of FIG. 12.

FIGS. 12 and 13 demonstrate a second illustrative construction for a stop mechanism operationally similar to the stop mechanism 22. This construction is shown in FIGS. 12 and 13. While functioning well, the embodiment of FIGS. 12 and 13 is considerably more expensive in implementation. Briefly, a stop 22A includes a pair of movable stop members 130 and 132. As indicated, the stop members also may be employed with the stop mechanism 22. The stop members 130 and 132 may be positioned in any of the openings 15 in the platform 13. A mounting block 134 again is of split collar design, and has an opening 136 formed in it. The opening 136 is sized to receive the shaft 18 of the rotary actuator 20. A shock absorber 138 is mounted to the block 134 and is connected to a source of fluid pressure through a coupling 140 and fluid lines 142 and 144. The shock absorber 138 acts as an opposed fluid cylinder, which will cushion the stop of the rotary actuator 20 as the rotation of the actuator 20 causes the shock absorber 138 to reach either of the stops 130 or 132. Again, the stop mechanism will function well in conjunction with an intermediate stop arrangement, if desired.

Operation of the robot 1 of this invention is relatively simple to understand. The microprocessor 2 is preprogrammed to control the solenoids 14 in any desired manner. Activation of the rotary actuator 20, causes the horizontal and vertical slide assemblies 6 and 5, respectively, to rotate about a vertical axis until the stop positions delimited by end stop members 130, 132 are reached. The rotational end stop positions are adjustable in the various manners described above. The microprocessor 2 also may be utilized to control the activation of the actuator 120, so that an intermediate stop position can be attained. Thereafter, the vertical and horizontal slide assemblies 5 and 6 are operated in a desired manner. For example, if vertical reciprocal movement is programmed, the amount of vertical movement desired is determined by the position of the adjustable tooling block 55 of the vertical slide assembly. Again, adjustment of the tool block 55 on the guide rods 52 and 53 permits precise setting of overall vertical travel. Overall horizontal reciprocal movement is controlled by adjusting the adjustable tooling block on the guide rods 52 and 53 of the vertical slide assembly 6 in a manner similar to that for which vertical travel was adjusted. Those skilled in the art will recognize that the stop position for vertical travel can be varied by changing the size of the stop 66 or using a suitable spacer, not shown, between tooling block 50 and end block 67. Thereafter, the amount of rotation of the wrist gripper 105 can be adjusted by the position of the set screws 95, or the location of the split lock cam means 79 on the shaft 86 of the actuator 84, for example. The wrist gripper 105 also can be adjusted by the position of the collar 101 on the shaft 86 of the actuator 84, and the position of the gripper 105 with respect to the mounting openings 101 in the collar 100. These various adjustments, the ease with which they can be made, and the simplicity of construction used in attaining these adjustable features all contribute to the very wide versatility of the robot 1.

Numerous variations, within the scope of the appended claims, will be apparent to those skilled in the art in light of the foregoing description and accompanying drawings. Thus, while split collars are the preferred method of attachment used in the embodiment illustrated, various other forms of locking devices may be employed if desired. Set screws also work well, for example. Certain embodiments or design forms were described as being preferred. Those skilled in the art will recognize that a number of changes can be made in part design or enclosure design without departing from the scope of the appended claims. While threaded fasteners have been employed throughout this design, other fastening devices are compatible with the broader aspects of this invention. While I prefer fluid actuators, the robot 1 can be operated entirely electrically, if desired. As indicated, the number of solenoids 14 or other control devices can be varied. For example, the robot 1 may employ a multiple number of the actuators 120 to provide a plurality of intermediate stop positions. These variations are merely illustrative.

Having thus described the invention, what is claimed and desired to be secured by Letters Patent is:

1. In a robot including a base plate having a first surface and a second raised surface, the raised surface defining a platform, a rotary drive device mounted to said platform, the rotary drive device having a shaft extending downwardly from said platform, the improvement comprising stop system means for defining first and second end of travel positions for said robot, at least one intermediate stop movably positioned with respect to said platform, and means for permitting said robot to reach said intermediate stop position regardless of the direction of approach of said robot toward said intermediate stop position, said last mentioned means including a stop having a material thickness, said last mentioned means further providing compensation for the material thickness of said stop so that said robot comes to a precise intermediate stop position repeatedly regardless of the direction of approach toward said intermediate stop position.

2. The robot of claim 1 wherein said rotary drive means is mounted to the platform of said base plate, said stop system means including an intermediate stop actuator mounted to said platform, said platform having at least one opening formed in it, said actuator having a shaft positioned to extend through the opening in said platform, and a support block mounted to the base plate of said support, said support block having an opening formed in it sized to receive the shaft of said actuator.

3. The robot of claim 2 wherein said rotary drive means has a shaft extending downwardly from said platform, the means for permitting said robot to reach said intermediate stop position further including stop means mounted to said shaft, said stop means including a mounting device attached to the shaft of said drive means and rotatable therewith, said mounting device having at least first and second cushioning means attached to it, said means for defining first and second end of travel positions for said robot being selectively positionable along said platform and being located so as to engage operatively alternate ones of said cushioning means during reversible rotational directional movement of said robot.

4. The robot of claim 3 wherein said stop means is further characterized by a stop member rotatably mounted with respect to said mounting device, said stop member having at least one surface positioned to engage said cushioning means, and a stop projection positioned to engage selectively said intermediate stop and said first and said second end of travel position defining means in a manner so as to define precise stop positions for said robot regardless of the direction of approach to said positions.

5. The robot of claim 4 further including an air manifold assembly connected at least fluidly with a source of fluid and being operatively connected to said rotary drive device, said manifold assembly comprising a slide connector plate having an arcuate opening in it, an air manifold mounted to said plate, said air manifold including a cylindrical core, said core having a plurality of lands and grooves formed its outer surface, respective ones of said lands and grooves being operatively connected to a plurality of axial passages communicating with the arcuate opening in said slide connector plate and a stationary sleeve sized to receive said core, said sleeve having a material thichkness, a plurality of radial openings formed in said material thickness, said radial openings being aligned to communicate with alternate ones of said grooves in said core.

6. A robot, comprising:
a support including a base plate having a first surface, and a second surface raised with respect to said first surface to define a platform;
a rotary drive device mounted to said platform, said device having a shaft extending downwardly from said platform and rotatable with respect to said platform;
stop system means mounted to said shaft and rotatable therewith, said stop system means including a stop mounting block attached to said shaft, first and second cushioning means mounted to said mounting block, and a stop member rotatably attached to said mounting block, said stop member having a material thickness; and at least three stops mounted to said support and positioned to engage stop member selectively, one of said stops defining an intermediate stop position for said robot, the stop defining the intermediate stop position having a material thickness, said stop member engaging said stop at said intermediate position so as to define a selectively repeatable intermediate stop position for said robot regardless of the direction of approach of said stop member to said stop by compensating for the material thickness of said stop member and said intermediate stop.

7. A robot, comprising:

a support;

a rotary drive device mounted to said support, said drive device including a shaft extending outwardly from said support, said shaft being rotatable with respect thereto;

stop system means mounted to said shaft and rotatable therewith, said stop system means including a stop mounting block attached to said shaft, said stop mounting block including first and second cushioning means attached to said block, a stop member mounted to said stop mounting block and being rotatable with respect thereto, said stop member having at least a first surface operatively engageable with said first and said second cushioning means, and a second stop engaging surface for engaging mechanical stop delimiting positions for said robot;

a plurality of stops mounted to said platform and selectively positionable to engage said stop member to define a plurality of positions for said robot, said stops including at least one intermediate stop selectively engageable with the second stop engaging surface of said stop member so as to delimit a repeatable intermediate stop position regardless of the direction of approach of said stop means with said stop.

8. A robot, comprising:

a support;

a rotary drive device mounted to said support, said drive device including a shaft extending from said support and being rotatable with respect thereto;

stop system means mounted to said shaft, said stop system means including a stop mounting block attached to said shaft, said stop mounting block including first and second cushioning means associated with said block, a stop member mounted to said stop mounting block and being rotatable with respect to said stop mounting block, said stop member having a first surface operatively engageable with respective ones of said first and said second cushioning means, a second a stop engaging device for engaging mechanical stops delimiting positions for said robot, and adjustment associated with said stop mounting block so as to permit said stop engaging device to reach a predetermined position with respect to a physical stop regardless of the direction of approach to said physical stop; and a least one physical stop mounted to said platform and engageable with said stop engaging device.

9. The robot of claim 8 in which said adjustment means comprises a member threadably adjustable with respect to said stop mounting block.

10. The robot of claim 9 wherein said threadably adjustable member comprises said cushioning means.

* * * * *